United States Patent
Savir et al.

(10) Patent No.: US 11,424,910 B2
(45) Date of Patent: Aug. 23, 2022

(54) ENTERPRISE STORAGE OF CUSTOMER TRANSACTION DATA USING A BLOCKCHAIN

(71) Applicant: EMC IP Holding Company LLC, Hopkinton, MA (US)

(72) Inventors: Amihai Savir, Sansana (IL); Anat Parush Tzur, Beer Sheva (IL); Or Herman Saffar, Beer Sheva (IL); Avitan Gefen, Tel Aviv (IL); Alon Shitrit, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 252 days.

(21) Appl. No.: 16/050,231

(22) Filed: Jul. 31, 2018

(65) Prior Publication Data
US 2020/0044823 A1 Feb. 6, 2020

(51) Int. Cl.
*H04L 9/06* (2006.01)
*G06Q 20/40* (2012.01)
(Continued)

(52) U.S. Cl.
CPC ........ *H04L 9/0637* (2013.01); *G06F 16/1805* (2019.01); *G06Q 20/401* (2013.01);
(Continued)

(58) Field of Classification Search
CPC . H04L 9/0637; H04L 63/123; H04L 2209/38; G06Q 20/401; G06Q 30/01; G06Q 30/0282
(Continued)

(56) References Cited

U.S. PATENT DOCUMENTS 8,108,266 B2 * 1/2012 Drudis ............... G06Q 30/0641
705/26.42
10,305,833 B1 * 5/2019 Dennis ..................... H04L 51/12
(Continued)

OTHER PUBLICATIONS

U.S. Appl. No. 15/078,211 entitled, "Integration of Heterogenous Data Using Omni-Channel Ontologies", filed Mar. 23, 2016.
https://auth0.com/docs/configure/sso, downloaded Aug. 31, 2021.

*Primary Examiner* — Venkat Perungavoor
*Assistant Examiner* — Peiliang Pan
(74) *Attorney, Agent, or Firm* — Ryan, Mason & Lewis, LLP

(57) ABSTRACT

A customer blockchain data store is provided. An exemplary method comprises obtaining a blockchain associated with a given customer of an enterprise having multiple customer communication channels, wherein the blockchain comprises transaction data for the given customer with the customer communication channels; obtaining new transaction data for the given customer for a given one of the customer communication channels; providing the new transaction data for the given customer to additional customer communication channels; receiving a validation of the new transaction data from the additional customer communication channels based on one or more predefined validation criteria; and storing the validated new transaction data for the given customer in the blockchain associated with the given customer. The validation optionally comprises the additional customer communication channels verifying information about the given customer in the new transaction data and/or aligning a customer identifier across the plurality of customer communication channels.

20 Claims, 6 Drawing Sheets

(51) Int. Cl.
*H04L 9/40* (2022.01)
*G06Q 30/00* (2012.01)
*G06Q 30/02* (2012.01)
*G06F 16/18* (2019.01)

(52) U.S. Cl.
CPC ......... *G06Q 30/01* (2013.01); *G06Q 30/0282* (2013.01); *H04L 63/123* (2013.01)

(58) Field of Classification Search
USPC ........................................................ 713/189
See application file for complete search history.

(56) References Cited

U.S. PATENT DOCUMENTS

| | | | | |
|---|---|---|---|---|
| 10,410,234 | B1* | 9/2019 | Madden | G06Q 30/0224 |
| 11,151,468 | B1* | 10/2021 | Chen | G06Q 30/0202 |
| 2004/0098315 | A1* | 5/2004 | Haynes | G06Q 30/0633 |
| | | | | 705/80 |
| 2007/0219901 | A1* | 9/2007 | Garbow | G06Q 30/0623 |
| | | | | 705/39 |
| 2014/0047355 | A1* | 2/2014 | Yerli | G06F 3/048 |
| | | | | 715/753 |
| 2014/0150669 | A1* | 6/2014 | Green | A23L 2/54 |
| | | | | 99/323.2 |
| 2014/0154369 | A1* | 6/2014 | Koi | B67D 1/008 |
| | | | | 426/115 |
| 2014/0257877 | A1* | 9/2014 | L'Heureux | G06Q 50/12 |
| | | | | 705/5 |
| 2015/0178819 | A1* | 6/2015 | Kassemi | G06Q 20/12 |
| | | | | 705/26.82 |
| 2016/0180466 | A1* | 6/2016 | Caldwell | G06T 11/206 |
| | | | | 705/17 |
| 2017/0308926 | A1* | 10/2017 | Wofford | G06Q 30/0245 |
| 2017/0358041 | A1* | 12/2017 | Forbes, Jr. | G05D 3/12 |
| 2017/0364918 | A1* | 12/2017 | Malhotra | G06Q 20/10 |
| 2018/0096360 | A1* | 4/2018 | Christidis | G06Q 20/02 |
| 2018/0144153 | A1* | 5/2018 | Pead | G06F 21/6245 |
| 2018/0197160 | A1* | 7/2018 | Hoffman | G06Q 30/02 |
| 2018/0300693 | A1* | 10/2018 | Gopinath | H04L 9/3236 |
| 2018/0349206 | A1* | 12/2018 | Erickson | G06F 40/263 |
| 2019/0005407 | A1* | 1/2019 | Harris | G06K 9/00973 |
| 2019/0012733 | A1* | 1/2019 | Gorman | G06Q 40/12 |
| 2019/0013934 | A1* | 1/2019 | Mercuri | G06F 11/3476 |
| 2019/0066228 | A1* | 2/2019 | Wright | G06F 16/27 |
| 2019/0102409 | A1* | 4/2019 | Shi | H04L 67/2823 |
| 2019/0123889 | A1* | 4/2019 | Schmidt-Karaca | H04L 9/3239 |
| 2019/0171975 | A1* | 6/2019 | Kurian | G06Q 30/00 |
| 2019/0180291 | A1* | 6/2019 | Schmeling | G16H 20/10 |
| 2019/0268162 | A1* | 8/2019 | Sahagun | H04L 9/0891 |
| 2019/0295126 | A1* | 9/2019 | Madden | G06Q 30/0256 |
| 2019/0312941 | A1* | 10/2019 | Maccini | G06F 16/2365 |
| 2019/0354979 | A1* | 11/2019 | Crawford | G06Q 20/405 |
| 2020/0004846 | A1* | 1/2020 | Camenisch | H04L 9/3239 |
| 2020/0005192 | A1* | 1/2020 | Kumar | G06N 20/00 |
| 2020/0019897 | A1* | 1/2020 | Kurian | G06Q 40/125 |
| 2020/0027106 | A1* | 1/2020 | Kendrick | G06Q 30/0209 |
| 2020/0034454 | A1* | 1/2020 | Chamarajnager | H04W 4/38 |
| 2020/0067697 | A1* | 2/2020 | Puddu | H04L 9/0637 |
| 2020/0111092 | A1* | 4/2020 | Wood | G06F 21/645 |
| 2021/0004923 | A1* | 1/2021 | MacKenzie | G06F 16/27 |

\* cited by examiner

ENTERPRISE STORAGE OF CUSTOMER TRANSACTION DATA USING A BLOCKCHAIN

FIELD

The invention relates generally to techniques for integrating heterogeneous multi-channel customer data.

BACKGROUND

Business models have changed dramatically in the past decade. The advent of the Internet, and particularly the appearance of additional digital channels, such as mobile and social media channels, have changed the execution of the retail mix and, more importantly, shopper behavior. Business experts advocate a seamless, multiple channel world where customers can shop across multiple channels in which businesses relate to their customers (such as Internet, mobile, radio, brick and mortar, print media and call center channels). Multiple channel business models are common, for example, in retail operations, banking and telecommunications.

Nevertheless, the information obtained from separate channels is often viewed as problematic because the information is typically kept in distinct repositories or databases, thus contributing to a distributed and fragmented view of the customer. In addition, the information obtained from separate channels varies greatly from channel to channel, given the differences in interaction promoted by each channel.

A need exists for techniques for integrating heterogeneous multi-channel data.

SUMMARY

In one embodiment, a method comprises obtaining at least a portion of a blockchain associated with a given customer of an enterprise having a plurality of customer communication channels, wherein the blockchain comprises transaction data for the given customer with the plurality of customer communication channels; obtaining new transaction data for the given customer for a given one of the plurality of customer communication channels; providing the new transaction data for the given customer with the given customer communication channel to additional customer communication channels of the plurality of customer communication channels; receiving a validation of the new transaction data for the given customer from the additional customer communication channels based on one or more predefined validation criteria; and storing the validated new transaction data for the given customer in the blockchain associated with the given customer.

In some embodiments, the validation comprises one or more of the additional customer communication channels verifying information about the given customer in the new transaction data and aligning a customer identifier across the plurality of customer communication channels.

In one or more embodiments, a customer view dashboard is provided to present various aspects of the customer data in the blockchain for a given customer. The customer view dashboard optionally presents one or more recommendations for the given customer and optionally presents a timeline view of interaction of the given customer with the enterprise.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for storing customer data from various communication channels of an enterprise in a customer blockchain data store.

One or more embodiments of the disclosure provide a blockchain data store for recording customer interactions with various portions of an enterprise, such as various business units, each potentially employing a different customer communication channel. The disclosed customer blockchain data store, in some embodiments, comprises a distinct blockchain for each unique customer comprising data about the customer from the various communication channels of the enterprise. In this manner, the disclosed customer blockchain data store creates a "digital identity" of the corresponding customer. In addition, the interaction history of a given customer is stored in one place, with the customer contact, for example, being the primary identifier.

In one or more embodiments, a new transaction is added to the blockchain of a given customer using a validation process among the various customer communication channels of a given enterprise. The validation process obtains approval from a number of the various customer communication channels, based on one or more specified validation criteria. The validation process may require, in some embodiments, that the new transaction employs the same username and/or email address of the customer as prior transactions of the same customer. In this manner, the disclosed customer blockchain data store aligns the customer across the multiple channels and resolves or reduces customer identification issues. Among other benefits, the validation process provides an opportunity for the various customer communication channels to identify redundant data and to eliminate data duplication. In addition, the validation process improves the quality of the data in the blockchain.

One or more aspects of the disclosure recognize that a blockchain platform provides a single customer view for all relevant parties of an enterprise. Due to the real time immutable nature of a blockchain, the blockchain provides a customer view that improves the customer relationship management experience and the regulatory compliance experience.

Figure 1:
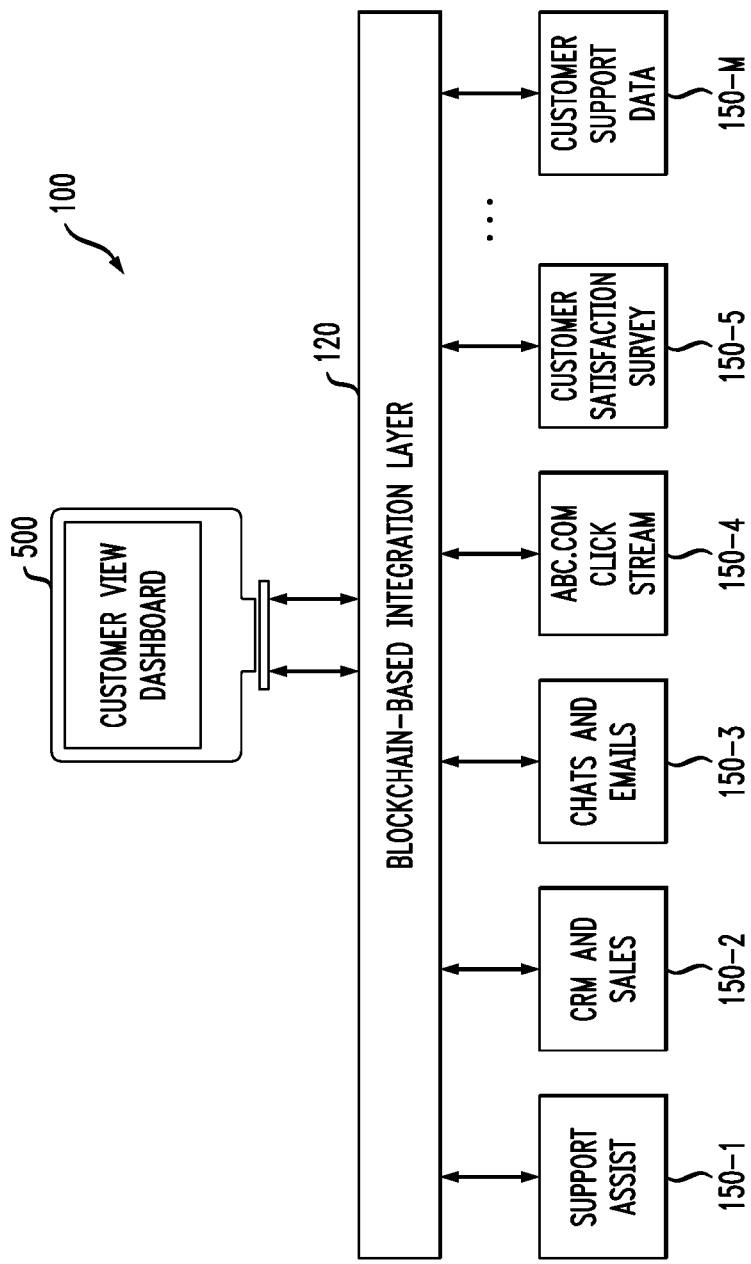
FIG. 1 illustrates a multi-channel enterprise environment for customer interactions, according to one embodiment of the disclosure.

FIG. 1 illustrates a multi-channel enterprise environment 100 for customer interactions, according to one embodiment of the disclosure. As shown in FIG. 1, the exemplary multi-channel enterprise environment 100 comprises multiple customer communication channels 150-1 through 150-M (collectively referred to as multiple communication channels 150), for example, associated with various business units of an enterprise. In the exemplary embodiment of FIG. 1, the multiple customer communication channels 150 comprise a support assist communication channel 150-1, a customer relationship management (CRM) and sales communication channel 150-2, a chat and emails communication channel 150-3, an enterprise web site click stream communication channel 150-4, a customer satisfaction communication channel 150-5 and a customer support data communication channel 150-M.

Generally, the various communication channels 150 collect data from some interaction with customers. In one or more embodiments, each communication channel 150 will maintain a chain of records that are synchronized. This mechanism helps to ensure that any data that will be added to the customer's chain will be correct and will not contradict any system ("miners"), as discussed further below in conjunction with FIG. 2.

As shown in FIG. 1, the various customer data received from the multiple communication channels 150 is aggregated using a blockchain-based integration layer 120. Generally, the exemplary blockchain-based integration layer 120 employs a customer blockchain data store and a validation process to integrate the customer data received from the multiple communication channels 150 for a given customer in a corresponding blockchain.

In some embodiments, the integrated customer data for a given customer is presented in an exemplary customer view dashboard 500, as discussed further below in conjunction with FIG. 5. In this manner, the exemplary customer view dashboard 500 provides a single view of the given customer. The exemplary customer view dashboard 500 optionally integrates one or more data analytics features.

As noted above, with conventional techniques, the multiple customer communication channels 150 employ a "silo database" approach, typically with a different database for each business unit or communication channel 150 of the enterprise.

Figure 2:
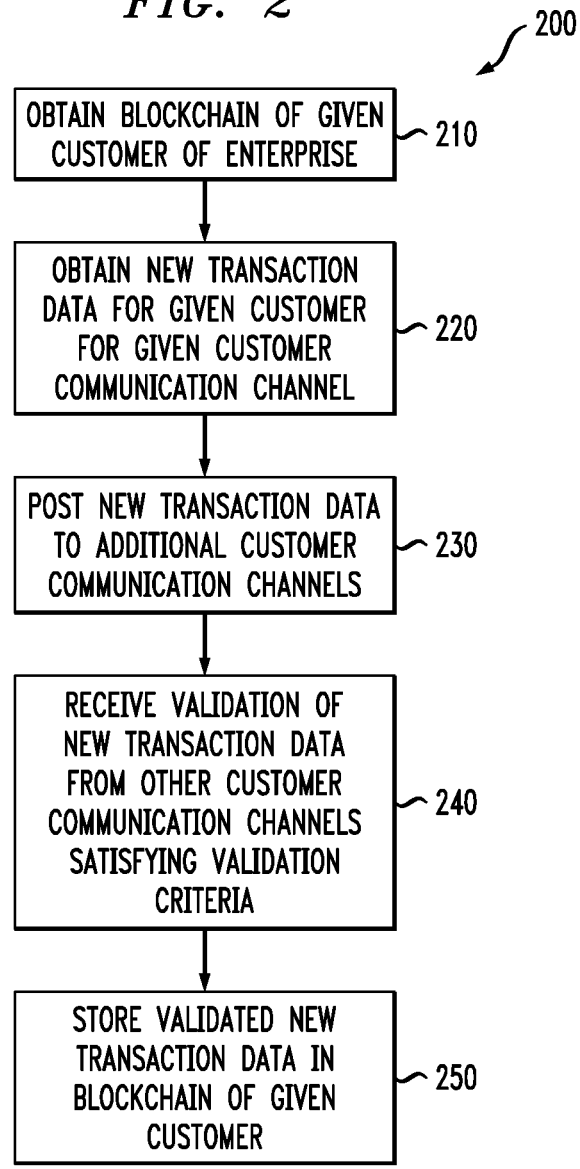
FIG. 2 is a flow chart illustrating an exemplary implementation of a customer blockchain data store process, according to an embodiment of the disclosure.

FIG. 2 is a flow chart illustrating an exemplary implementation of a customer blockchain data store process 200, according to an embodiment of the disclosure. As shown in FIG. 2, the exemplary customer blockchain data store process 200 initially obtains a blockchain (discussed further below in conjunction with FIG. 3) associated with a given customer of an enterprise during step 210. As noted above, the enterprise has a plurality of customer communication channels 150. In addition, the blockchain comprises transaction data for the given customer with the plurality of customer communication channels. In some embodiments, a separate copy of the blockchain is maintained for each of the customer communication channels 150, as discussed further below in conjunction with FIG. 3.

During step 220, the exemplary customer blockchain data store process 200 obtains new transaction data for the given customer for a given one of the customer communication channels 150. The given customer communication channel 150 posts the new transaction data for the given customer during step 230 to additional customer communication channels 150, for example, using a temporary blockchain validation board.

The given customer communication channel 150 associated with the new transaction data receives a validation of the new transaction data during step 240 from a number of the additional customer communication channels based on one or more predefined validation criteria. The predefined validation criteria may specify, for example, that a majority of the additional customer communication channels 150, or a specified number of the additional customer communication channels 150 with an interest in the transaction data, must approve the new transaction data.

In some embodiments, the validation process requires that the additional customer communication channels 150 verify information about the given customer in the new transaction data. For example, the validation further may comprise one or more of the additional customer communication channels 150 verifying that the given customer has a product specified by the new transaction data. In addition, the additional customer communication channels 150 optionally verify that one or more identifiers of the given customer or additional metadata are aligned across the additional customer communication channels 150.

In one or more embodiments, the validation process optionally also incorporates a conflict resolution mechanism when there is an inconsistency among the data records of a given customer.

Finally, the exemplary customer blockchain data store process 200 stores the validated new transaction data for the given customer during step 250 in the blockchain associated with the given customer, as discussed further below in conjunction with FIG. 4.

Figure 3:
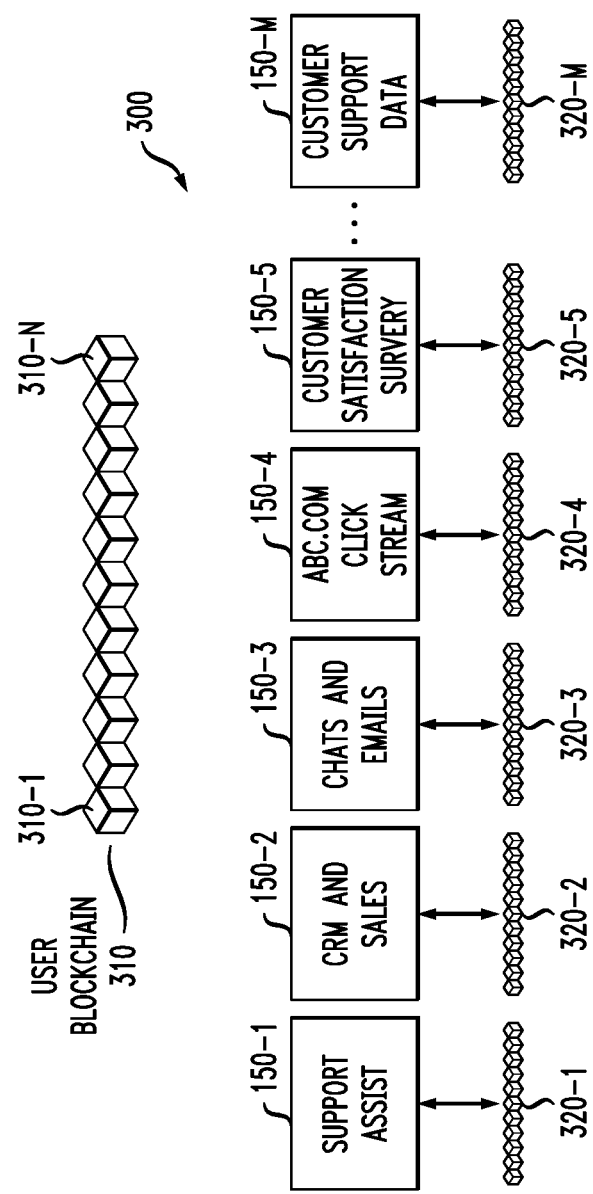
FIG. 3 illustrates an exemplary implementation of a multi-channel customer blockchain data store, according to some embodiments.

FIG. 3 illustrates an exemplary implementation of a multi-channel customer blockchain data store 300, according to some embodiments. As noted above and shown in FIG. 3, in one or more embodiments, a user blockchain 310 is associated with a given customer of an enterprise, with multiple customer communication channels 150-1 through 150-M. The exemplary user blockchain 310 comprises transaction data records 310-1 through 310-N for the given customer with the plurality of customer communication channels 150.

In the embodiment of FIG. 3, a separate copy 320-1 through 320-M of the user blockchain 310 is maintained for each of the corresponding customer communication channels 150-1 through 150-M.

Generally, in some embodiments, a blockchain is a continuously growing list of records, called blocks, that are linked and secured using cryptography. Each block typically contains a cryptographic hash of the previous block, a timestamp and transaction data. By design, a blockchain, such as the exemplary user blockchain 310, is inherently resistant to modification of the data. A blockchain is often considered an open, distributed ledger for recording transactions between two parties, for example, in a permanent and verifiable manner. When used as a distributed ledger, a blockchain is typically managed by a peer-to-peer network collectively adhering to a protocol for inter-node communication and validating new blocks. Once recorded, the data in any given block cannot be altered retroactively without the alteration of all subsequent blocks, which requires collusion of the network majority.

Figure 4:
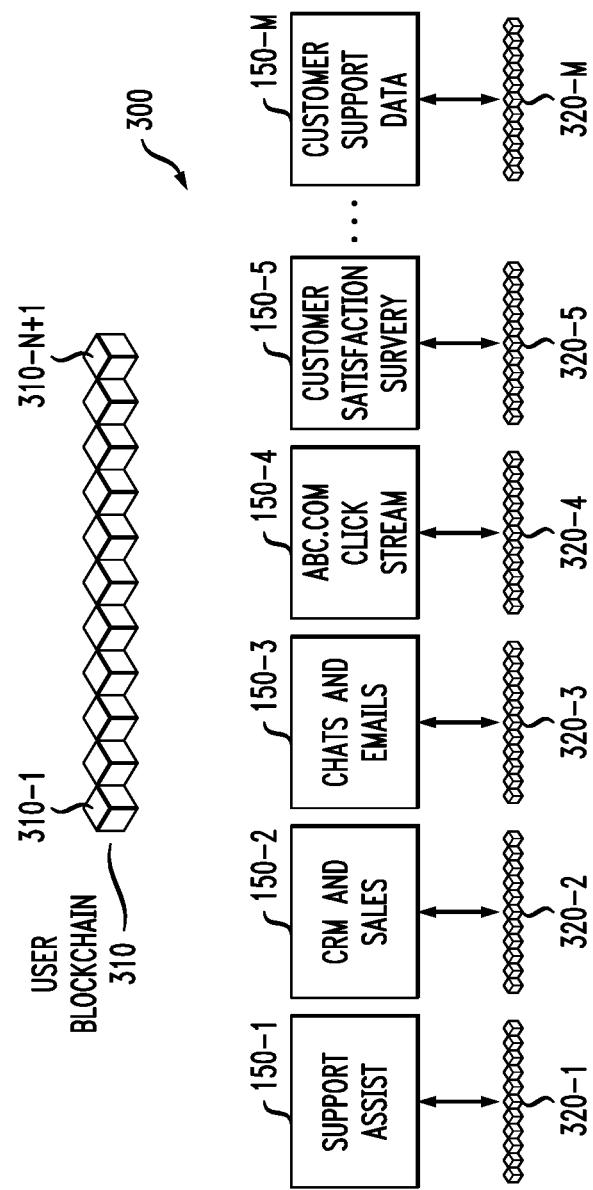
FIG. 4 illustrates an exemplary update of the multi-channel customer blockchain data store of FIG. 3 with a new customer transaction, according to at least one embodiment.

FIG. 4 illustrates an exemplary update of the multi-channel customer blockchain data store 300 of FIG. 3 with a new customer transaction, according to at least one embodiment. In the example of FIG. 4, a specific business unit (e.g., support assist communication channel 150-1) obtains a new customer transaction for a particular customer and would like to add a record to the user blockchain 310 (or create a new user blockchain 310 if it does not already exist for the particular customer).

For example, the support assist communication channel 150-1, when collecting data from a customer machine, will pack the data into a new transaction data block that includes the collected data and metadata about the user (e.g., address, phone, serial number, email, and username).

The support assist communication channel 150-1 posts the new transaction data for the particular customer to the additional customer communication channels 150-2 through 150-M, for example, using a temporary blockchain validation board in order to validate the new transaction data. The additional customer communication channels 150-2 through 150-M (or a portion thereof, consistent with the predefined validation criteria) validate the new record. For example, a majority of the additional customer communication channels 150-2 through 150-M may be required to approve the new record before it can be added to the user blockchain 310.

The given customer communication channel 150-1 receives the validation of the new transaction data from the additional customer communication channels 150 based on one or more predefined validation criteria. As noted above, the predefined validation criteria may specify, for example, that a majority of the additional customer communication channels 150, or a specified number of the additional customer communication channels 150 with an interest in the transaction data, must approve the new transaction data.

The validated new transaction data for the given customer is appended to the user blockchain 310 as a new transaction data record 310-N+1. In addition, the separate copies 320-1 through 320-M of the user blockchain 310 for each of the corresponding customer communication channels 150-1 through 150-M are updated with the new transaction data record 310-N+1.

Figure 5:
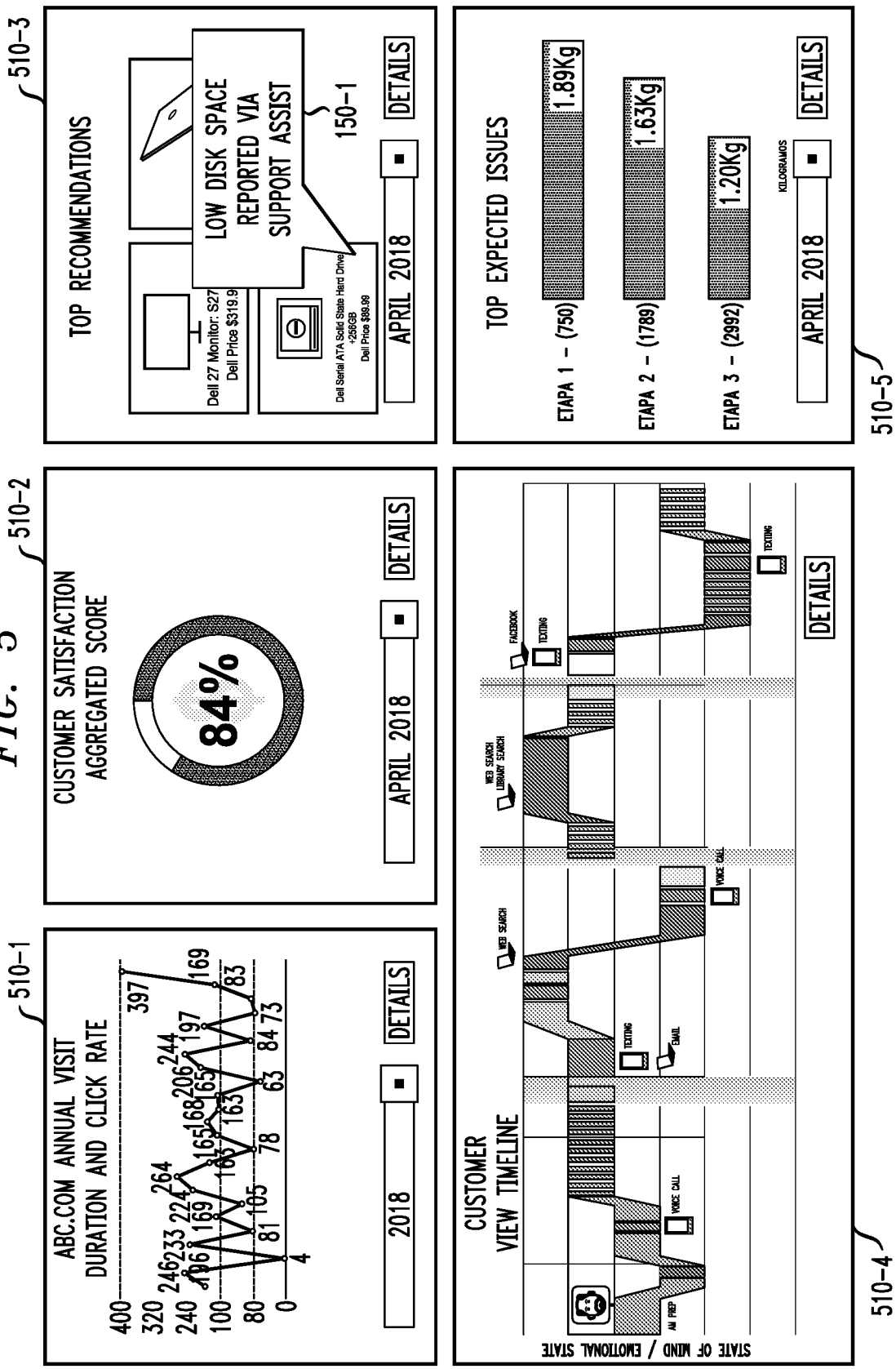
FIG. 5 illustrates an exemplary customer view dashboard for presenting various aspects of the stored customer data, according to one embodiment.

FIG. 5 illustrates an exemplary customer view dashboard 500, according to one embodiment. Generally, the exemplary customer view dashboard 500 presents the integrated customer data for a given customer from the corresponding user blockchain 310 and provides a single view of the given customer. The exemplary customer view dashboard 500 optionally integrates one or more data analytics and query features.

As shown in FIG. 5, the exemplary customer view dashboard 500 comprises an enterprise website annual visit duration and click rate panel 510-1; a customer satisfaction aggregated score panel 510-2; a top recommendations panel 510-3; a customer view timeline panel 510-4; and a top expected issues panel 510-5.

Generally, the exemplary enterprise website annual visit duration and click rate panel 510-1 illustrates the customer's habits with respect to duration and click rate when engaged with the website of the enterprise. The exemplary customer satisfaction aggregated score panel 510-2 presents a single score representing the satisfaction of the particular customer with his or her experiences with the enterprise (for example, based on customer satisfaction surveys with respect to recent calls and/or emails and other communications).

In addition, the exemplary top recommendations panel 510-3 displays one or more recommendations generated, for example, by machine learning and/or artificial intelligence tools. For example, the recommendations panel 510-3 can identify products where the customer has contacted the support team of the enterprise or has recently interacted with on the enterprise website (suggesting products and/or services for proactive sales opportunities that the customer may need to purchase and/or upgrade). For example, if the customer support team has learned that the customer has low disk space, the recommendations panel 510-3 can identify additional storage products to offer the customer. In this manner, the exemplary customer view dashboard 500 optionally automatically matches consumer behavior to targeted advertising in real-time.

In some embodiments, the exemplary customer view timeline panel 510-4 provides a user timeline view showing the interactions of the customer with the enterprise in a single timeline. A visual aid, such as a predefined color or an icon, can be optionally employed, for example, to identify the communication channel 150. The Y Axis of the exemplary customer view timeline panel 510-4 indicates the sentiment of the customer at the time of each interaction, using a predefined convention.

Finally, the exemplary top expected issues panel 510-5 identifies one or more issues that the customer is predicted to encounter, for example, using an artificial intelligence tool.

In this manner, the exemplary customer view dashboard 500 combines the data about of customers into a single view that provides knowledge and a better understanding of the needs of each customer. In some embodiments, the disclosed customer blockchain data store comprises the different customer data assets with information about the customer, integrated into a single place that can be queried to obtain a full view of the customer.

In further variations, the customer data from the user blockchain 310 can be used to build an automated marketing pipeline, for example, via emails or different channels, optionally using the same analytic engines that populate the exemplary customer view dashboard 500. In this manner, the disclosed customer blockchain data store enables better personalized marketing and targeted campaigns.

Among other benefits, the disclosed customer blockchain data store provides an improved ability to comply with government regulations that specify, for example, how to control and process personal data, as needed. In Europe, for example, the General Data Protection Regulation (GDPR) regulates data protection and privacy for all individuals. The GDPR aims primarily to give control to citizens over their personal data and to simplify the regulatory environment for international business. One or more requirements of the GDPR are compromised with existing approaches.

In some embodiments, the disclosed customer blockchain data store accommodates the right of a customer to be forgotten. While existing customer data storage techniques have duplications and different identifiers for the same customers, the disclosed user blockchain approach can more easily remove the customer data that had been collected for a specific customer.

In addition, the disclosed customer blockchain data store optionally inherently protects the customer data in each user blockchain 310. With existing approaches, however, when one of the business unit systems is compromised, the entire organization can be influenced, as it can cause duplications and identity management issues.

For example, as noted above, blockchains are considered substantially immutable and thereby protected and secured from modifications (e.g., once information is stored in the blockchain, parts of the information cannot be changed or deleted), thereby improving security and customer trust.

One or more embodiments of the disclosure provide improved methods, apparatus and computer program products for storing customer data from various communication channels of an enterprise in a customer blockchain data store. The foregoing applications and associated embodiments should be considered as illustrative only, and numerous other embodiments can be configured using the techniques disclosed herein, in a wide variety of different applications.

It should also be understood that the disclosed customer blockchain data store, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques storing customer data from various communication channels of an enterprise in a customer blockchain data store may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based customer blockchain data engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based customer blockchain data platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
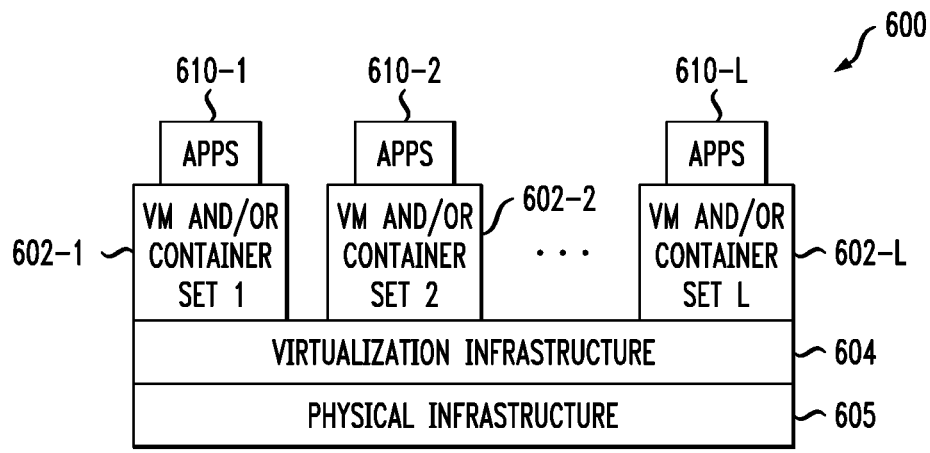
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the disclosed customer blockchain data store. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide customer blockchain data storage functionality of the type described above for one or more processes running on a given one of the VMs. For example, each of the VMs can implement customer blockchain data storage control logic and associated customer blockchain data storage functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide customer blockchain data storage functionality of the type described above for one or more processes running on different ones of the containers. For example, a container host device supporting multiple containers of one or more container sets can implement one or more instances of customer blockchain data storage control logic and associated customer blockchain data stores for use in storing customer information across an enterprise.

As is apparent from the above, one or more of the processing modules or other components of the disclosed customer blockchain data store may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
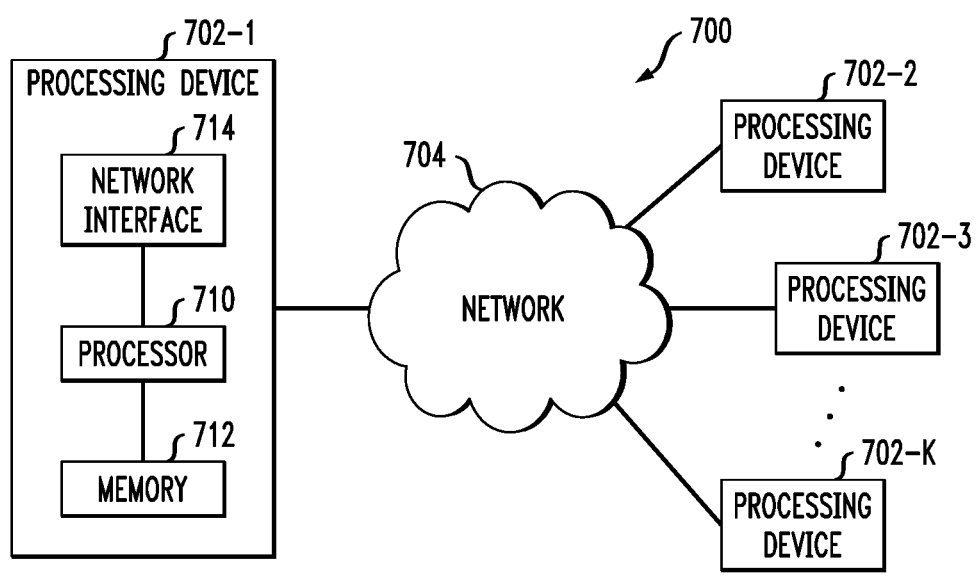
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining at least a portion of a blockchain associated with a given customer of an enterprise having a plurality of different business units, wherein the blockchain comprises transaction data for the given customer with the plurality of different business units of the enterprise;

obtaining new transaction data for the given customer for a given one of the plurality of different business units of the enterprise;

providing, by at least one processing device, the new transaction data for the given customer with the given business unit of the enterprise to one or more additional business units of the plurality of different business units of the enterprise, wherein the given business unit is distinct from the one or more additional business units;

receiving, by the at least one processing device, a validation of the new transaction data for the given customer from one or more of the additional business units of the enterprise based on one or more predefined validation criteria;

storing, by the at least one processing device, the validated new transaction data for the given customer in the blockchain associated with the given customer;

aligning a plurality of different identifiers of the given customer in the blockchain using a primary identifier, wherein each of the plurality of different identifiers of the given customer is submitted by the given customer, prior to the aligning, to one or more of the plurality of different business units, wherein the plurality of different identifiers comprises one or more of a username of the given customer and an email address of the given customer; and recommending one or more of a new product and a new service for the given customer by applying machine learning techniques to one or more prior transactions of the given customer with the enterprise using the aligned different identifiers of the given customer in the transaction data in the blockchain associated with the given customer, wherein the recommending the one or more of the new product and the new service is based at least in part on at least one prior transaction of the given customer associated with a different business unit of the enterprise than a business unit of the enterprise associated with one or more of the recommended new product and the recommended new service.

2. The method of claim 1, wherein the validation comprises one or more of the additional customer communication channels verifying information about the given customer in the new transaction data.

3. The method of claim 2, wherein the validation further comprises verifying that the given customer has a product specified by the new transaction data.

4. The method of claim 1, further comprising the step of presenting a customer view dashboard of the transaction data in the blockchain for the given customer.

5. The method of claim 4, wherein the customer view dashboard of the transaction data for the given customer presents the one or more of the recommended new product and the recommended new service for the given customer.

6. The method of claim 4, wherein the customer view dashboard of the transaction data for the given customer presents a timeline view of interactions of the given customer with the enterprise.

7. The method of claim 1, wherein a copy of the blockchain is maintained for each of the plurality of customer communication channels.

8. The method of claim 1, further comprising removing at least a portion of the transaction data in the blockchain associated with the given customer using the aligned different identifiers of the given customer in the transaction data.

9. A system, comprising:
a memory; and
at least one processing device, coupled to the memory, operative to implement the following steps:
obtaining at least a portion of a blockchain associated with a given customer of an enterprise having a plurality of different business units, wherein the blockchain comprises transaction data for the given customer with the plurality of different business units of the enterprise;

obtaining new transaction data for the given customer for a given one of the plurality of different business units of the enterprise;

providing, by at least one processing device, the new transaction data for the given customer with the given business unit of the enterprise to one or more additional business units of the plurality of different business units of the enterprise, wherein the given business unit is distinct from the one or more additional business units;

receiving, by the at least one processing device, a validation of the new transaction data for the given customer from one or more of the additional business units of the enterprise based on one or more predefined validation criteria;

storing, by the at least one processing device, the validated new transaction data for the given customer in the blockchain associated with the given customer;

aligning a plurality of different identifiers of the given customer in the blockchain using a primary identifier, wherein each of the plurality of different identifiers of the given customer is submitted by the given customer, prior to the aligning, to one or more of the plurality of different business units, wherein the plurality of different identifiers comprises one or more of a username of the given customer and an email address of the given customer; and recommending one or more of a new product and a new service for the given customer by applying machine learning techniques to one or more prior transactions of the given customer with the enterprise using the aligned different identifiers of the given customer in the transaction data in the blockchain associated with the given customer, wherein the recommending the one or more of the new product and the new service is based at least in part on at least one prior transaction of the given customer associated with a different business unit of the enterprise than a business unit of the enterprise associated with one or more of the recommended new product and the recommended new service.

10. The system of claim 9, wherein the validation comprises one or more of the additional customer communication channels verifying information about the given customer in the new transaction data.

11. The system of claim 9, further comprising the step of presenting a customer view dashboard of the transaction data in the blockchain for the given customer.

12. The system of claim 11, wherein the customer view dashboard of the transaction data for the given customer presents the one or more of the recommended new product and the recommended new service for the given customer.

13. The system of claim 9, wherein a copy of the blockchain is maintained for each of the plurality of customer communication channels.

14. The system of claim 9, further comprising removing at least a portion of the transaction data in the blockchain associated with the given customer using the aligned different identifiers of the given customer in the transaction data.

15. A computer program product, comprising a non-transitory machine-readable storage medium having encoded therein executable code of one or more software programs, wherein the one or more software programs when executed by at least one processing device perform the following steps:
obtaining at least a portion of a blockchain associated with a given customer of an enterprise having a plurality of different business units, wherein the blockchain comprises transaction data for the given customer with the plurality of different business units of the enterprise;

obtaining new transaction data for the given customer for a given one of the plurality of different business units of the enterprise;

providing, by at least one processing device, the new transaction data for the given customer with the given business unit of the enterprise to one or more additional business units of the plurality of different business units of the enterprise, wherein the given business unit is distinct from the one or more additional business units;

receiving, by the at least one processing device, a validation of the new transaction data for the given customer from one or more of the additional business units of the enterprise based on one or more predefined validation criteria;

storing, by the at least one processing device, the validated new transaction data for the given customer in the blockchain associated with the given customer;

aligning a plurality of different identifiers of the given customer in the blockchain using a primary identifier, wherein each of the plurality of different identifiers of the given customer is submitted by the given customer, prior to the aligning, to one or more of the plurality of different business units, wherein the plurality of different identifiers comprises one or more of a username of the given customer and an email address of the given customer; and recommending one or more of a new product and a new service for the given customer by applying machine learning techniques to one or more prior transactions of the given customer with the enterprise using the aligned different identifiers of the given customer in the transaction data in the blockchain associated with the given customer, wherein the recommending the one or more of the new product and the new service is based at least in part on at least one prior transaction of the given customer associated with a different business unit of the enterprise than a business unit of the enterprise associated with one or more of the recommended new product and the recommended new service.

16. The computer program product of claim 15, wherein the validation comprises one or more of the additional customer communication channels verifying information about the given customer in the new transaction data.

17. The computer program product of claim 15, further comprising the step of presenting a customer view dashboard of the transaction data in the blockchain for the given customer.

18. The computer program product of claim 17, wherein the customer view dashboard of the transaction data for the given customer presents the one or more of the recommended new product and the recommended new service for the given customer.

19. The computer program product of claim 15, wherein a copy of the blockchain is maintained for each of the plurality of customer communication channels.

20. The computer program product of claim 15, further comprising removing at least a portion of the transaction data in the blockchain associated with the given customer using the aligned different identifiers of the given customer in the transaction data.

\* \* \* \* \*